(12) United States Patent
Quennehen et al.

(10) Patent No.: US 10,738,635 B2
(45) Date of Patent: Aug. 11, 2020

(54) TURBINE ENGINE TURBINE INCLUDING A NOZZLE STAGE MADE OF CERAMIC MATRIX COMPOSITE MATERIAL

(71) Applicant: SAFRAN AIRCRAFT ENGINES, Paris (FR)

(72) Inventors: Lucien Henri Jacques Quennehen, Paris (FR); Sebastien Serge Francis Congratel, La Brosse Montceaux (FR); Nicolas Paul Tableau, Paris (FR); Matthieu Arnaud Gimat, Merignac (FR); Clement Marie Benoit Roussille, Bordeaux (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/874,298

(22) Filed: Jan. 18, 2018

(65) Prior Publication Data

US 2018/0202302 A1 Jul. 19, 2018

(30) Foreign Application Priority Data

Jan. 18, 2017 (FR) .................................... 17 50375

(51) Int. Cl.
 F01D 9/04 (2006.01)
 F01D 25/24 (2006.01)
(52) U.S. Cl.
 CPC ............. F01D 9/042 (2013.01); F01D 9/041 (2013.01); F01D 25/246 (2013.01);
 (Continued)
(58) Field of Classification Search
 CPC ......... F01D 9/041; F01D 9/042; F01D 25/246
 See application file for complete search history.

(56) References Cited

U.S. PATENT DOCUMENTS

| 5,272,869 A * | 12/1993 | Dawson ................. F01D 9/042 |
| | | 415/142 |
| 6,884,030 B2 * | 4/2005 | Darkins, Jr. ............ F01D 9/042 |
| | | 29/889.22 |

(Continued)

FOREIGN PATENT DOCUMENTS

| EP | 3 009 601 A1 | 4/2016 |
| EP | 3 121 379 A1 | 1/2017 |
| EP | 3 121 384 A1 | 1/2017 |

OTHER PUBLICATIONS

French Preliminary Search Report dated Oct. 18, 2017 in French Application 17 50375 filed on Jan. 18, 2017 (with English Translation of Categories of Cited Documents).

*Primary Examiner* — Richard A Edgar
*Assistant Examiner* — Michael K. Reitz
(74) *Attorney, Agent, or Firm* — Oblon, McClelland, Maier & Neustadt, L.L.P.

(57) ABSTRACT

A turbine for a turbine engine is disclosed. The turbine includes a casing and a turbine nozzle stage made of a ceramic matrix composite material and including annular sectors forming a ring presenting an inner shroud and an outer shroud. Each annular sector has an inner platform forming part the inner shroud and an outer platform forming part of the outer shroud, and an airfoil extending between the outer platform and the inner platform and secured thereto. The airfoil presents a hollow profile defining an inside housing extending between the inner platform and the outer platform, and the inner and outer platforms each presenting an orifice communicating with the inside housing of the airfoil. Each annular sector includes a strut passing through the orifices in the platforms and through the inside housing of the airfoil. The strut is fastened to the casing and is connected with the annular sector.

8 Claims, 2 Drawing Sheets

(52) U.S. Cl.
CPC .... *F05D 2220/30* (2013.01); *F05D 2230/642* (2013.01); *F05D 2240/128* (2013.01); *F05D 2240/50* (2013.01); *F05D 2300/10* (2013.01); *F05D 2300/6033* (2013.01); *Y02T 50/672* (2013.01); *Y02T 50/673* (2013.01)

(56) References Cited

U.S. PATENT DOCUMENTS

| | | | |
|---|---|---|---|
| 2008/0279679 A1* | 11/2008 | Morrison | F01D 9/042 415/191 |
| 2015/0125291 A1* | 5/2015 | Chokshi | F01D 9/065 415/209.4 |
| 2016/0090851 A1 | 3/2016 | Carr et al. | |
| 2016/0177761 A1* | 6/2016 | Huizenga | F01D 9/047 415/209.3 |
| 2017/0022828 A1 | 1/2017 | Heitman et al. | |
| 2017/0022833 A1 | 1/2017 | Heitman et al. | |

\* cited by examiner

TURBINE ENGINE TURBINE INCLUDING A NOZZLE STAGE MADE OF CERAMIC MATRIX COMPOSITE MATERIAL

BACKGROUND OF THE INVENTION

The invention relates to turbine engines, in particular to aviation turboshaft engines or to industrial turbines, and more particularly to a turbine nozzle stage made of ceramic matrix composite material or of composite material having a matrix that is made at least in part of ceramic, and referred to below as CMC material.

The field of application of the invention is in particular that of gas turbine aero engines. Nevertheless, the invention is applicable to other turbine engines, for example industrial turbines.

Improving the performance of turbine engines and reducing their polluting emissions leads to envisaging ever higher operating temperatures.

For elements of hot portions of turbine engines, proposals have thus been made to use ceramic matrix composite materials, written CMC materials below.

CMC materials are typically formed by fiber reinforcement made of refractory fibers, such as carbon fibers or ceramic fibers, and densified by a matrix that is made of ceramic or at least partially of ceramic.

These materials possess remarkable thermostructural properties, i.e. mechanical properties that make them suitable for constituting structural elements, together with the ability of conserving these properties at high temperatures. Furthermore, CMC materials are of density that is much lower than the density of the metal materials conventionally used for elements of hot portions of turbine engines.

Thus, Documents WO 2010/061140, WO 2010/116066, and WO 2011/080443 describe making blades of turbine engine rotor wheels with integrated inner and outer platforms out of CMC. The use of CMC materials for turbine nozzles has also been proposed, in particular in Documents WO 2010/146288, FR 2 979 662, and EP 2 443 318.

A conventional metal turbine nozzle stage is in the form of a ring made up of a plurality of assembled-together sectors, each sector having an inner platform, an outer platform, and a plurality of vanes extending between the inner and outer platforms and secured thereto. The juxtaposed inner platforms form an inner shroud and the juxtaposed outer platforms form an outer shroud. The inner and outer shrouds define a gas flow passage through the nozzle stage.

Introducing a nozzle stage, e.g. a high-pressure nozzle stage, that is made of CMC makes it possible to increase the maximum temperature that can be tolerated compared with a nozzle stage that is made of metal, thereby reducing the quantity of cooling air that needs to be used. This thus makes it possible to increase the performance of the turbine engine.

Nevertheless, because of its properties that are very different from those of metal, CMC is more sensitive to certain mechanical stresses. Specifically, CMC presents greater stiffness and smaller expansion. It behaves better in compression, but its acceptable traction stresses are smaller than those of metal.

Furthermore, it is difficult to introduce a CMC part in a metal environment because of differential thermal expansion between CMC and metal. This is particularly difficult in a turbine engine, and more particularly in a high-pressure portion of the engine, since the environment is very hot, thereby exacerbating the differences in the coefficients of thermal expansion between the materials, and the aerodynamic forces to which a high-pressure nozzle stage is subjected are also very high in this region of the turbine.

A high-pressure nozzle stage is known that comprises annular sectors that are held in position firstly by using two pegs passing through a round hole and an oblong hole made in a bottom portion of the inner platform, the bottom portion extending along a radial direction from an inside face of the bottom shroud formed by the nozzle stage, and secondly by using an abutment mounted on an outside face of the outer platform, the top portion projecting from the outer platform in the radial direction of the annular ring.

That architecture leads to an integration constraint since it is not possible to attach the annular sectors from above, i.e. to attach them to the outer casing.

The vane of a nozzle is subjected to large forces from the combustion gas. When the nozzle is attached from above, i.e. via the casing, or from below, the combustion gas causes the vane to bend, thereby constituting a source of stresses.

Documents US 2008/279679 and EP 3 009 601 disclose turbines having a nozzle stage with annular sectors having vanes with struts coupled to the casing passing therethrough.

OBJECT AND SUMMARY OF THE INVENTION

The invention seeks to mitigate the above-mentioned drawbacks and to overcome the above-mentioned difficulties by proposing a turbine engine turbine having a turbine nozzle stage made of CMC, for which assembly is simplified and adapted to holding the annular sectors in deterministic manner, while enabling the annular sectors to deform independently of interfacing metal parts.

The invention firstly provides a turbine for a turbine engine, the turbine comprising a casing and a turbine nozzle stage, the nozzle stage of the turbine being made of a ceramic matrix composite material and comprising a plurality of annular sectors forming a ring presenting an inner shroud and an outer shroud, each annular sector having both an inner platform forming a portion of the inner shroud and an outer platform forming a portion of the outer shroud, and at least one airfoil extending between the outer platform and the inner platform and secured thereto, and the metal ring comprising at least one at least partially annular sector, said airfoil presenting a hollow profile defining an inside housing extending between the inner platform and the outer platform, and each of the inner and outer platforms presenting an orifice communicating with the inside housing of the airfoil.

According to a general characteristic of the invention, each annular sector of the nozzle stage includes a strut passing through said orifices in the platforms and through the inside housing of the airfoil, the strut firstly being fastened to said casing and secondly being in connection with said annular sector.

The strut serves to provide means for fastening an annular sector of a CMC nozzle stage from above, i.e. for fastening to the casing, while minimizing the bending moment, insofar as the bending length is reduced by about half because the strut passes through the annular sector.

Each annular sector of the nozzle stage is thus held in deterministic manner, i.e. in such a manner as to avoid the annular sector vibrating, and while controlling its position, with this being done while enabling the annular sector to deform independently of the interfacing metal parts, under the effects of temperature and pressure among others.

In a first aspect of the turbine, the turbine further comprises a bushing engaged in the inside housing of the airfoil and fastened to the strut in order to hold the airfoil in position.

The bushing defines a ball joint serving to minimize the force due to the aerodynamic moment, without modifying the way the ring sector is integrated in the turbine. Specifically, the ball joint formed by the bushing fastened to the inside of the airfoil leaves the airfoil free to move about the axis defined by the strut.

In a second aspect of the turbine, the turbine further comprises first and second pegs, the inner platform having a portion projecting towards the inside of the ring of the nozzle stage and presenting both a circular first orifice configured to receive the first peg and an oblong second orifice configured to receive the second peg, the strut further including circular third and fourth orifices, the first peg passing through the first orifice and the third orifice, and the second peg passing through the second orifice and the fourth orifice in order to fasten the strut to the annular sector.

The oblong shape of the second orifice accommodates differential expansion between the strut and the annular sector.

In an embodiment of the second aspect of the turbine, the outer platform may include an abutment projecting towards the casing from the face of the outer platform that faces the casing, and the casing may include an annular rib projecting towards the outer platform and co-operating with said abutment.

The abutment and the rib serve to prevent the annular sector from tilting about the axis between the two pegs as a result of force from the gas.

In a third aspect of the turbine, the strut is made of metal material so as to provide good mechanical strength, the strut taking up all of the aerodynamic forces in order to transfer them to the casing.

The strut may be made of any other material.

In a fourth aspect of the turbine, the strut is made integrally with the casing. In a variant, the strut may be screw fastened or welded to the casing.

In a fifth aspect of the turbine, each annular sector has a plurality of airfoils and a strut for each airfoil of the annular sector.

The invention also provides a turbine engine including at least one turbine as defined above.

The invention also provides an aircraft including at least one turbine engine as defined above.

BRIEF DESCRIPTION OF THE DRAWINGS

The invention can be better understood on reading the following description given by way of nonlimiting indication and with reference to the accompanying drawings, in which.

DETAILED DESCRIPTION OF EMBODIMENTS

Figure 1:
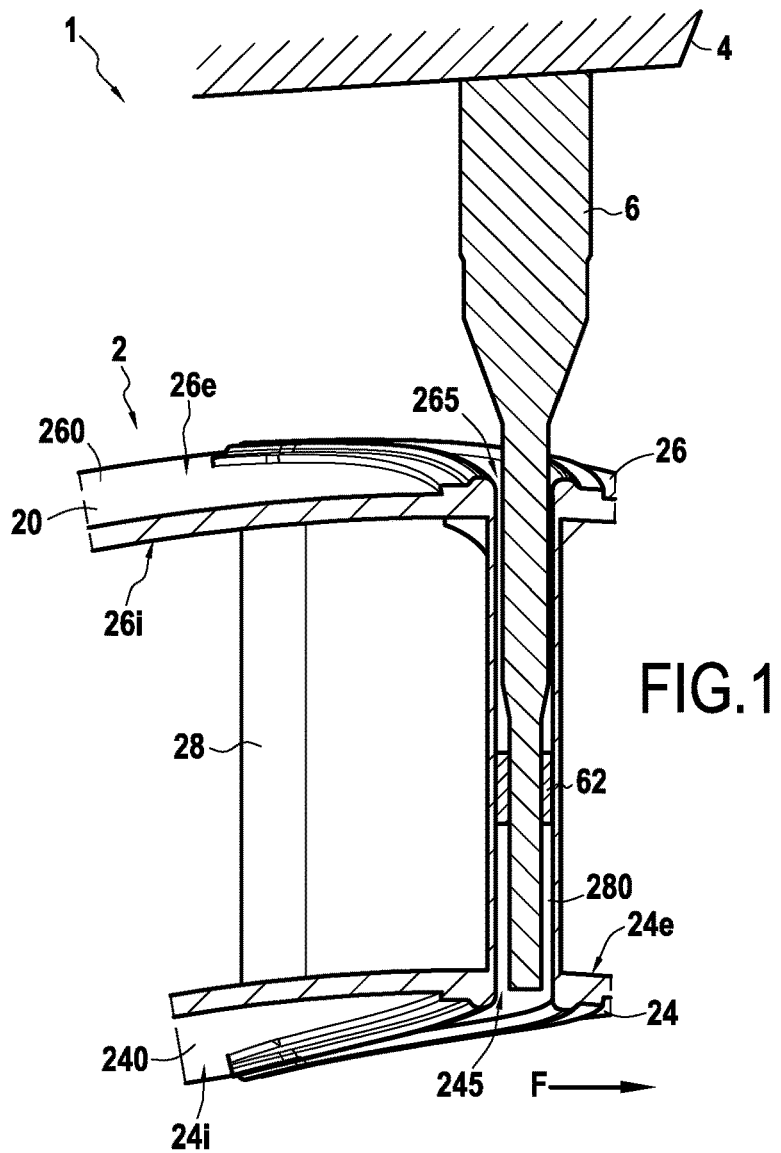
FIG. 1 is a diagrammatic section view of a portion of a turbine engine turbine in a first embodiment of the invention.
Figure 2:
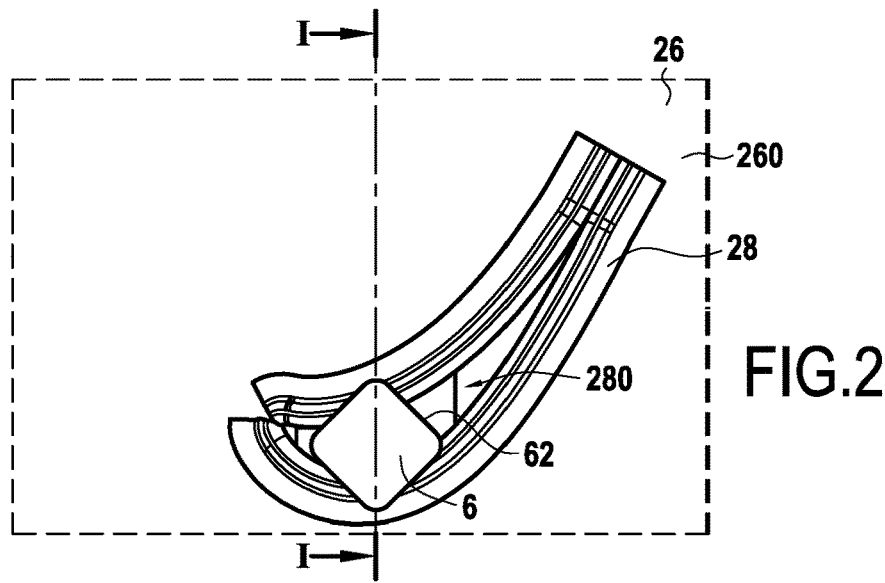
FIG. 2 is a diagrammatic view from above of the FIG. 1 turbine portion.

FIGS. 1 and 2 are respectively a diagrammatic section view and a diagrammatic plan view of a turbine engine turbine in a first embodiment of the invention.

A high-pressure turbine 1 of a turbine engine, e.g. an aviation turboshaft engine, as shown in part in FIG. 1, comprises a plurality of stationary nozzle stages 2 that alternate with rotary wheels 3 in the flow direction, represented by an arrow in FIG. 1, of the gas stream F through the turbine 1 and mounted in a turbine casing 4.

Each rotor wheel 3 has a plurality of blades 32 with an inner shroud 34, and at least one airfoil 38 that extends from the inner shroud 34 and that is connected thereto. On the inside of the inner shroud 34, the blade is extended by a root engaged in a housing in a disk 33. On the outside, the tips of the blades 32 face an abradable material carried by a ring 36 in order to provide sealing at the tips of the blades 32.

Throughout the present specification, the terms "inner" and "outer" are used concerning a position or an orientation relative to the axis of rotation X of the turbine 1.

The blades 32 may be conventional metal blades, or they may be blades made of CMC material, e.g. obtained in the manner described in Documents WO 2010/061140, WO 2010/116066, WO 2011/080443.

At least one of the nozzle stages, such as the nozzle stage 2 of FIG. 1, is formed by uniting a plurality of angular sectors 20 made of CMC material as shown in FIG. 2, which is a perspective view of the turbine portion shown in FIG. 1.

Each angular sector 20 of the nozzle stage 2 comprises an inner platform 24, an outer platform 26, and an airfoil 28 extending between the inner and outer platforms 24 and 26, and secured thereto. In a variant, a plurality of airfoils could extend between the inner and outer platforms of a given nozzle sector. Once assembled with the casing 4 of the turbine 1, the sectors 20 form a single nozzle ring 2 presenting an inner shroud 240 formed by juxtaposing the inner platforms 24 of the sectors 20, and an outer shroud 260 formed by juxtaposing the outer platforms 26 of the sectors 20.

The inner shroud 240 of the nozzle stage 2 presents an outer surface 24e and an inner surface 24i, and the outer shroud 260 of the nozzle stage 2 likewise presents an outer surface 26e and an inner surface 26i. Since the sectors 20 form the nozzle stage 2, the inner platform 24 of each section 20 thus presents a portion of the outside surface 24e and a portion of the inside surface 24i of the outer shroud 240, and the outer platform 26 of each sector 20 likewise presents a portion of the outside surface 26e and a portion of the inside surface 26i of the inner shroud 216. The airfoil 28 of each sector 20 extends between the outside surface 24e of the inner shroud 240 and the inside surface 26i of the outer shroud 260, and more particularly between the corresponding portion of the outside surface 24e and the corresponding portion of the inside surface 24i.

The outside surfaces 24e and 34e of the inner shrouds 240 and 34 of the nozzle stage 2 and of the rotor wheels 3 and the inside surfaces 26i and 36i of the outer shroud 260 of the nozzle stage 2 and of the sealing ring 36 of the rotor wheels 3 define a flow passage 45 for the gas stream F through the turbine 1.

Throughout this text, the terms "upstream" and "downstream" are used relative to the flow direction of the gas stream F in the passage 45 as shown by an arrow.

Each airfoil 28 possesses a hollow profile that presents an inside housing 280 extending over the full height of the airfoil 28, i.e. between the inner platform 24 and the outer platform 26 of the annular sector 20. In the plane in which the inner platform 24 of each annular section 20 extends, it includes an orifice 245 of shape corresponding to the section of the inside housing 280. Likewise, in the plane in which the outer platform 26 of each annular section 20 extends, it includes an orifice 265 of shape corresponding to the section of the inside housing 280. The orifices 245 and 265 of the inner and outer platforms 24 and 26 are made in line with the inside housing 280 in the airfoil 28.

For each annular sector 20, the turbine 1 also comprises a strut 6 welded to the casing 4 and extending in the radial direction towards the axis of revolution of the turbine 1, which corresponds to the axis of revolution of the casing 4. The strut 6 is configured to pass through the orifices 245 and 265 in the inner and outer platforms 24 and 26 and through the inside housing 280 in the corresponding airfoil 28.

When each annular sector has a plurality of airfoils, the turbine has additionally a corresponding number of struts for each annular sector of the nozzle.

In the first embodiment shown in FIGS. 1 and 2, each airfoil 28 also has a bushing 62 inserted in and fastened to the inside of the inside housing 280. The bushing 62 is configured to have the strut 6 pass therethrough, without preventing it from turning about its own axis of revolution. The bushing 62 thus co-operates with the strut 6 to define a ball joint serving to stiffen the airfoil 28 in the radial plane of the turbine 1.

Assembly is performed by fastening each annular sector 20 one by one on the corresponding strut 6 of the casing 4 and by holding the annular sectors 20 as positioned in this way by using a special tool until all of the annular sectors 20 are positioned so as to form an annular nozzle ring.

Figure 3:
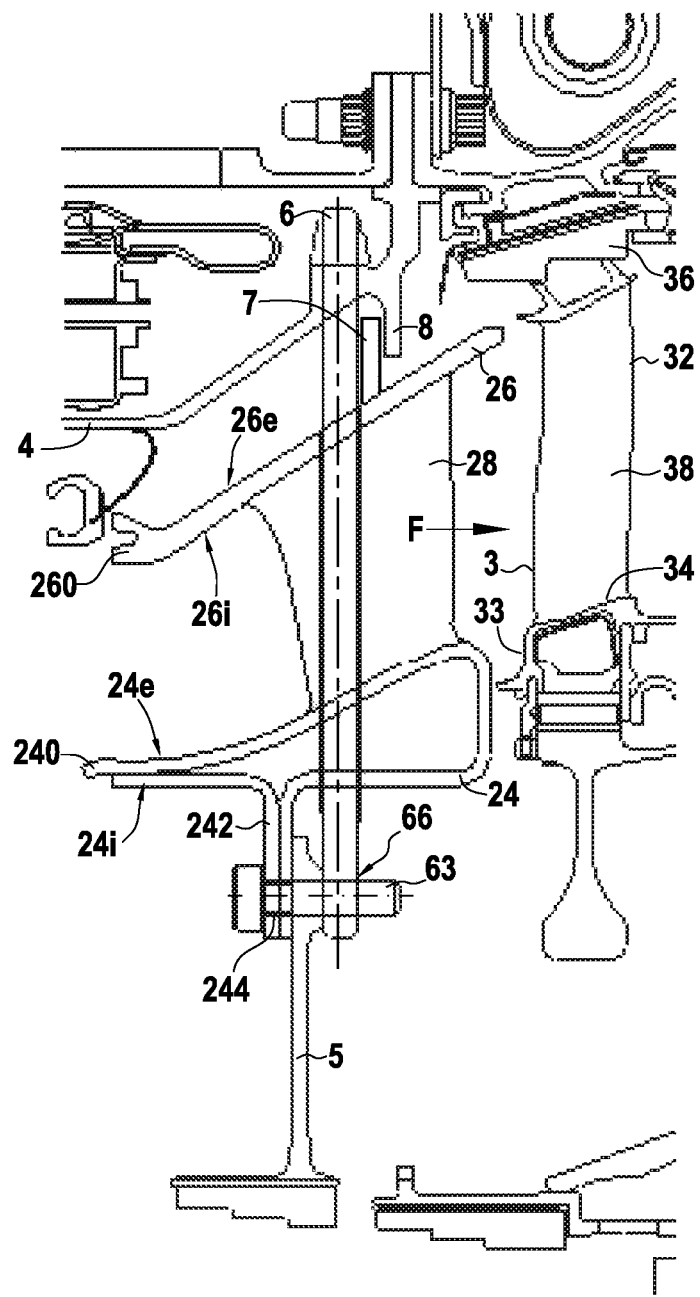
FIG. 3 is a diagrammatic section view of a portion of a turbine engine turbine in a second embodiment of the invention.

In FIG. 3, there can be seen a diagrammatic section view of a portion of a turbine engine turbine in a second embodiment of the invention.

Elements that are identical to the first embodiment shown in FIGS. 1 and 2 are given the same numerical references.

The second embodiment differs from the first embodiment in that, for each annular sector 20 of the nozzle stage 2, the connection between the strut 6 and the annular sector 20 is made not via a bushing, but by using a first peg 63 and a second peg, that is not visible in the section view of FIG. 3, given that it is hidden by the first peg 63.

In this embodiment, the inner platform 24 of each annular sector 20 presents a portion 242 projecting from its inside surface 24i towards the inside of the ring of the nozzle stage 2. The projecting portion 242 presents a circular first orifice 244 configured to receive the first peg 63, and an oblong second orifice configured to receive the second peg.

In addition, the strut 6 includes a circular third orifice 66 and a circular fourth orifice, the first peg 63 passing through the first orifice 244 and the third orifice 66, and the second peg passing through the second orifice and the fourth orifice in order to fasten the strut 6 to the annular sector 20.

Also, as shown in FIG. 3, the first and second pegs 63 also pass respectively through first and second orifices in an inner metal ring 5 in order to fasten the metal ring to the nozzle stage 2.

The outer platform 26 of the annular sector 20 also includes an abutment 7 projecting from the outside surface 26e of the outer platform 26 towards the casing 4, and the casing 4 has an annular rib 8 projecting towards the outer platform 26, i.e. towards the inside of the ring of the turbine 1, in cooperation with the abutment 7.

The abutment 7 and the rib 8 serve to prevent the annular sector 20 from tilting about the axis between the two pegs 63 as a result of force from the gas. The pegs 63 and the abutment 7 together with the rib 8 thus serve to position the airfoil 28 of the nozzle 2 both radially and tangentially, and also to stiffen the airfoil 28 in the radial plane of the turbine. Under the effect of force from the gas, the sector tilts about the axis formed by the round and oblong first and second orifices 244. The abutment then prevents the nozzle from tilting.

The invention thus provides a turbine engine turbine comprising a turbine nozzle stage made of CMC that can be assembled in simplified manner and that is suitable for holding the annular sectors in deterministic manner while enabling the annular sector to deform independently of the interfacing metal parts.

The invention claimed is:

1. A turbine for a turbine engine, the turbine comprising:
   a casing; and
   a turbine nozzle stage being made of a ceramic matrix composite material and comprising a plurality of annular sectors forming a ring presenting an inner shroud and an outer shroud, each annular sector having
      an inner platform forming a portion of the inner shroud,
      an outer platform forming a portion of the outer shroud, and
      an airfoil extending between the outer platform and the inner platform and secured thereto, said airfoil presenting a hollow profile defining an inside housing extending between the inner platform and the outer platform, and each of the inner and outer platforms presenting an orifice communicating with said inside housing of the airfoil,
   wherein each annular sector of the nozzle stage includes a strut passing through said orifices in the platforms and through the inside housing of said airfoil, a first extremity of said strut being fastened to said casing and being in connection with said annular sector, and a second extremity of said strut being free, and
   wherein a bushing is inserted inside the inside housing of the airfoil such that an outer surface of the bushing contacts an inside surface of the inside housing of the airfoil, the strut passing through the bushing in order to hold the airfoil in position and the bushing being rotatable about an axis of the strut.

2. The turbine according to claim 1, wherein the strut is made of metal material.

3. The turbine according to claim 1, wherein the strut is made integrally with the casing.

4. The turbine according to claim 1, wherein each annular sector has a plurality of airfoils and a strut for each airfoil of the annular sector.

5. A turbine engine comprising:
   a turbine, the turbine comprising
      a casing; and
      a turbine nozzle stage being made of a ceramic matrix composite material and comprising a plurality of annular sectors forming a ring presenting an inner shroud and an outer shroud, each annular sector having
         an inner platform forming a portion of the inner shroud,
         an outer platform forming a portion of the outer shroud, and
         an airfoil extending between the outer platform and the inner platform and secured thereto, said airfoil presenting a hollow profile defining an inside housing extending between the inner platform and the outer platform, and each of the inner and outer platforms presenting an orifice communicating with said inside housing of the airfoil,
   wherein each annular sector of the nozzle stage includes a strut passing through said orifices in the platforms and through the inside housing of said airfoil, a first extremity of said strut being fastened to said casing and being in connection with said annular sector, and a second extremity of said strut being free, and wherein a bushing is inserted inside the inside housing of the airfoil such that an outer surface of the bushing contacts an inside surface of the inside housing of the airfoil, the strut passing through the bushing in order to hold the airfoil in position and the bushing being rotatable about an axis of the strut.

6. The turbine engine according to claim 5, wherein the strut is made of metal material.

7. The turbine engine according to claim 5, wherein the strut is made integrally with the casing.

8. The turbine engine according to claim 5, wherein each annular sector has a plurality of airfoils and a strut for each airfoil of the annular sector.

\* \* \* \* \*